United States Patent [19]
Tobin

[11] 4,113,563
[45] Sep. 12, 1978

[54] FUEL ARRANGEMENT FOR HIGH TEMPERATURE GAS COOLED REACTOR

[75] Inventor: Joseph M. Tobin, McMurray, Pa.

[73] Assignee: Westinghouse Electric Corp., Pittsburgh, Pa.

[21] Appl. No.: 646,812

[22] Filed: Jan. 6, 1976

[51] Int. Cl.² .............................................. G21C 5/00
[52] U.S. Cl. ........................................ 176/84; 176/61
[58] Field of Search ...................... 176/16, 18, 40, 50, 176/61, 84

[56] References Cited

U.S. PATENT DOCUMENTS

| | | | |
|---|---|---|---|
| 2,812,303 | 11/1957 | Daniels | 176/84 X |
| 2,841,545 | 7/1958 | Zinn | 176/40 X |
| 2,975,117 | 3/1961 | Zinn | 176/40 X |
| 3,591,453 | 7/1971 | Gratton | 176/40 X |
| 3,607,643 | 9/1971 | Paget | 176/84 |
| 3,658,645 | 4/1972 | Hooper | 176/59 X |
| 3,738,912 | 6/1973 | Rachor | 176/84 X |
| 3,773,618 | 11/1973 | Gratton | 176/61 X |
| 3,891,502 | 6/1975 | Hackstein et al. | 176/84 X |
| 3,926,720 | 9/1975 | Hosegood | 176/84 X |

FOREIGN PATENT DOCUMENTS 1,908,379  9/1970  Fed. Rep. of Germany ............. 176/18

*Primary Examiner*—Peter A. Nelson
*Attorney, Agent, or Firm*—Edward L. Levine; Z. L. Dermer

[57] ABSTRACT

A fuel arrangement for a high temperature gas cooled reactor including fuel assemblies with separate directly cooled fissile and fertile fuel elements removably inserted in an elongated moderator block also having a passageway for control elements.

9 Claims, 10 Drawing Figures

FUEL ARRANGEMENT FOR HIGH TEMPERATURE GAS COOLED REACTOR

BACKGROUND OF THE INVENTION

1. Field of the Invention

This invention relates to a fuel arrangement for high temperature gas cooled reactors. More particularly, it provides an arrangement whereby separated directly cooled fissile and fertile fuel bearing elements are removably inserted in a plurality of prismatic moderator blocks, resulting in high coolant gas temperatures and more efficient fuel utilization.

2. Description of the Prior Art

It is well understood that the thermal efficiency of a heat cycle generally increases as the maximum temperature of the heated fluid increases. This is equally true in a nuclear reactor primary system circuit. However, unique to a nuclear reactor cycle is that in increasing overall thermal efficiency, one must also take into account those factors relating to reprocessing of the nuclear fuel resulting in maximum fuel usage. In this sense, "efficiency" refers as well to overall utilization of raw, manufactured, and recycled fissile and fertile fuels. Among the major limitations on efficient usage of nuclear fuels are those associated with reprocessing fuel containing valuable bred and unused isotopes. In the past, no arrangement has been utilized which directly facilitates non-destructive removable insertion of separate directly cooled fissile and fertile isotopes within the same fuel assembly. This is particularly true in high temperature gas cooled reactors (HTGR) which typically comprise fuel elements of coated fissile and fertile isotopes homogeneously distributed in a graphite matrix. Separation of the recycleable isotopes in such a configuration involves complex and costly techniques before full advantage can be taken of any unused or bred fuel. Although a homogeneous distribution may have short-term advantages in core power control, it has long-term disadvantages in nuclear fuel reprocessing and utilization. Another type of prior art fuel element for an HTGR is disclosed in U.S. Pat. No. 3,891,502, issued June 24, 1975 to Karl-Gerhard Hackstein et al. That patent discloses a fuel element wherein fertile and fissile fuel elements are separately disposed within a graphite moderator block. There, however, the elements are connected with the assembly graphite matrix directly and without transition, so as to contribute an integral portion of the mechanical strength of the block. Due to the necessity to contribute to the ultimate structural integrity of the block, the elements are of a continuous cross section, and cannot be directly cooled, therefore limiting the maximum safe coolant temperature that can be achieved. Further, such arrangements require the fuel elements to be mechanically drilled out of the graphite block, thereby destroying the block. Other teachings have disclosed a type of direct cooling of fuel elements, such as U.S. Pat. No. 3,738,912 issued June 12, 1973 to Lothar Rachor et al. Such teachings, however are not only based upon a homogeneous fuel distribution, but also upon mechanical means, such as specially designed spacers, to support the fuel elements within a cooling channel.

The need for power generation today is a serious concern, and commercial nuclear power plants are assuming a major worldwide role in achieving necessary electrical generation capacity. Energy needs of the future, however, may be measured not only in terms of electrical generation capacity, but also in terms of the need for synthetic liquid and gaseous fuels, fertilizers and other compounds. Hydrogen is a basic element necessary in fulfilling these needs. It is the critical element in production of ammonia for fertilizers, in iron ore reduction, in coal hydrogenation and hydrogasification, and in methanol production, among others. High temperature gas reactors, as opposed to higher pressure but lower temperature water cooled reactors, can provide a nuclear source with the capability to produce the high temperatures needed for hydrogen production and other process systems. HTGR's to date, however, have been limited to coolant temperatures for sustained long-term operation in the range of 1400° F. to 1700° F. This is basically due to maintaining safe maximum fuel temperatures and consequently rather low power densities. The low power densities further result in extremely large, massive, and costly cores and associated structures.

It is evident that a nuclear fuel arrangement which provides a very high temperature coolant without excessive fuel temperatures, and also provides non-destructable separation of fissile and fertile isotopes from the fuel assembly for reprocessing, will prove of vital importance to many existing and future worldwide energy needs.

SUMMARY OF THE INVENTION

This invention relates to a fuel arrangement for a high temperature gas cooled reactor with separate and non-destructively removable fissile and fertile fuel elements capable of achieving gas coolant temperatures in the range of 1400° F. to 2250° F. The arrangement includes a plurality of fuel assemblies of preferably hexagonal moderator blocks with each block containing removable directly cooled fissile and fertile fuel elements. The fuel elements comprise coated fuel particles in a graphite matrix, achieving high power densities. The coolant gas passes axially through a coolant passageway in each fuel element, maintained in axial alignment throughout the core. This allows direct cooling of the fuel element, which results in higher coolant gas temperatures while maintaining acceptable maximum fuel temperatures. Upon removal of a fuel assembly from the reactor, the fuel elements may be individually pushed out of the moderator block, to either be reprocessed or subsequently reinserted in a moderator block. Power distribution control is achieved chiefly by movable control rods, passed through the moderator blocks, and by burnable neutron absorbers distributed homogeneously throughout the moderator blocks. Coolant temperature may also be controlled by varying the size of openings within retainer elements which support the elements within the assembly, so as to limit the amount of coolant passing through a given element. For reasons of safety and improved quality control, the fertile and fissile fuel bearing elements are preferably of differing cross-section dimension to ensure proper placement in the moderator block, and are preferably cylindrical.

BRIEF DESCRIPTION OF THE DRAWINGS

The functions and advantages of this invention will become more apparent from the following description based upon an example reactor system and the accompanying drawings, in which.

DESCRIPTION OF THE PREFERRED EMBODIMENTS

This invention provides a fuel arrangements for a high temperature gas cooled reactor including high matrix density directly cooled fuel elements removably inserted in fuel assemblies, capable of safely producing coolant temperatures in the range of 1400° F. to 2250° F. It further provides for more efficient fuel usage and simplified fuel reprocessing through positive separation of the non-destructively removable and directly cooled fertile and fissile fuel elements.

Figure 1:
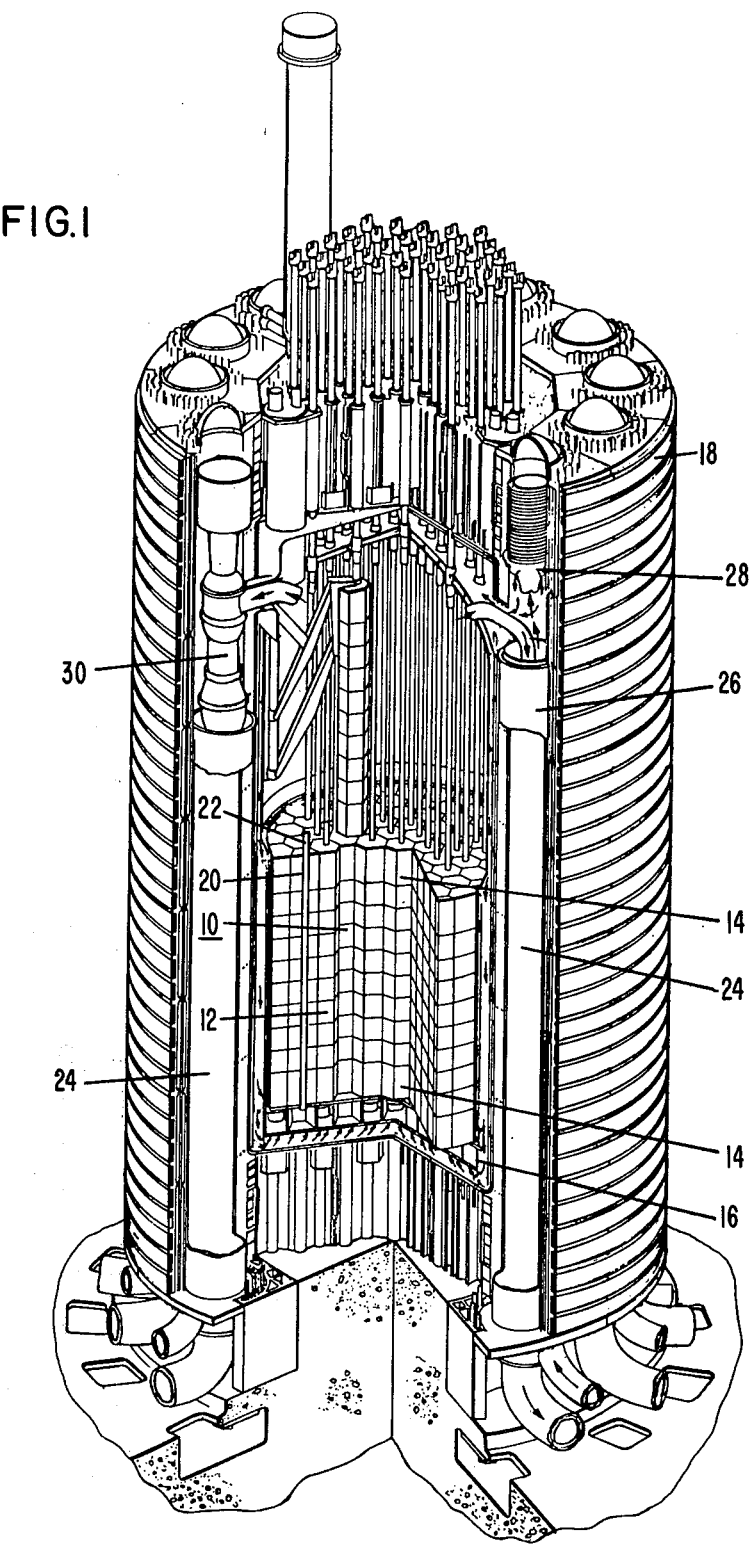
FIG. 1 is a partial cutaway view of a high temperature gas cooled reactor system utilizing the fuel arrangement of this invention.

The advantages of this invention will become readily apparent to those skilled in the art from this description which includes an exemplary reactor system, shown in FIG. 1. It should be understood that the fuel arrangement of the instant invention may be utilized with equivalent benefits in other high temperature gas cooled reactor concepts, and the example is put forth to point out major parameters achievable through this invention.

FIG. 1 shows an exemplary core 10 comprised of a plurality of generally hexagonal fuel assemblies 12 and surrounded by shield/reflector assemblies 14. A complete column of assemblies 12, 14 is shown being removed from the core 10. The shield/reflector assemblies 14 are placed above, below, and about the periphery of the fuel assemblies 12. As shown, the fuel assemblies 12 are axially aligned in columns, which, packed adjacent one another, give the core a generally circular cross-section. The assemblies 12, 14 are removably supported at the bottom by a core support plate 16 supported within a prestressed cast iron reactor vessel (PCIV) 18. Each fuel assembly 12 is shown with a centrally located control passageway 20 through which a control element 22 of neutron absorbing material, such as boron carbide, may be removably inserted and removed to control core power. Each assembly may also comprise a plurality of control passageways 20.

Figure 2:
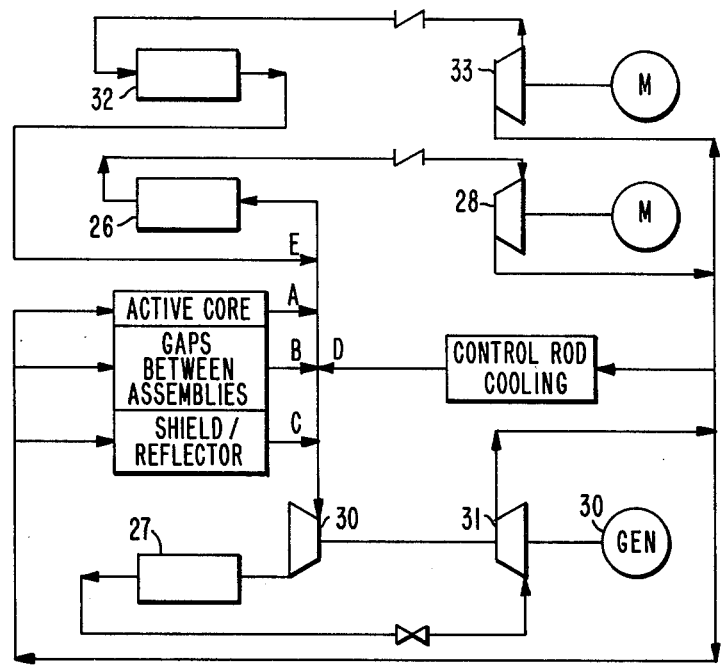
FIG. 2 is a flow schematic of the reactor system of FIG. 1, showing flow and temperature distribution.
Figure 3:
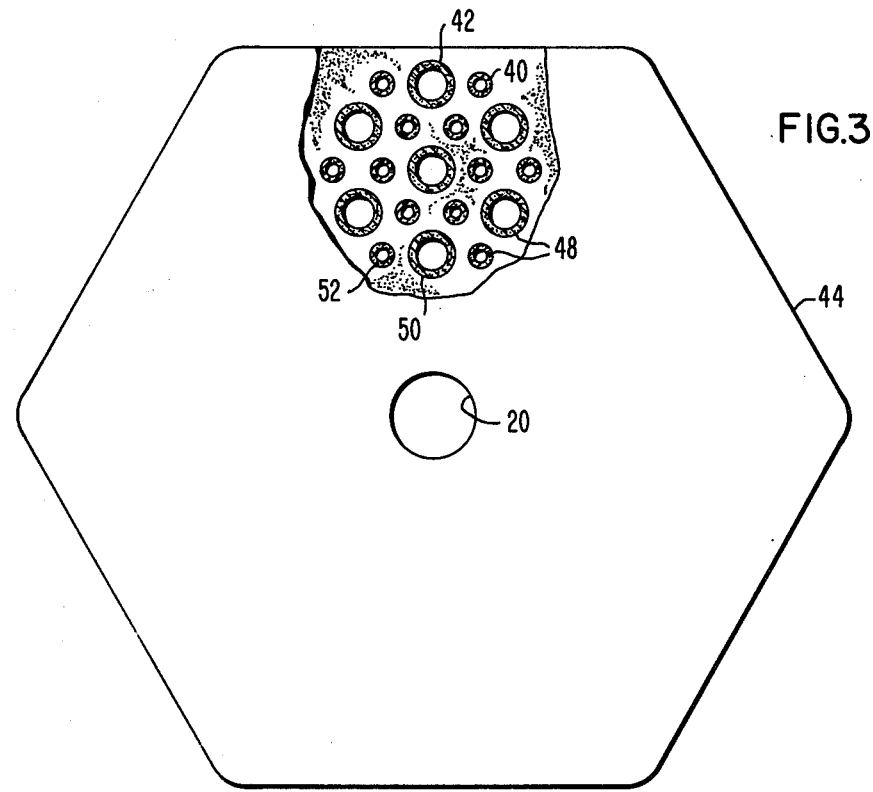
FIG. 3 is a partial plan view of a fuel assembly of this invention.
Figure 4:
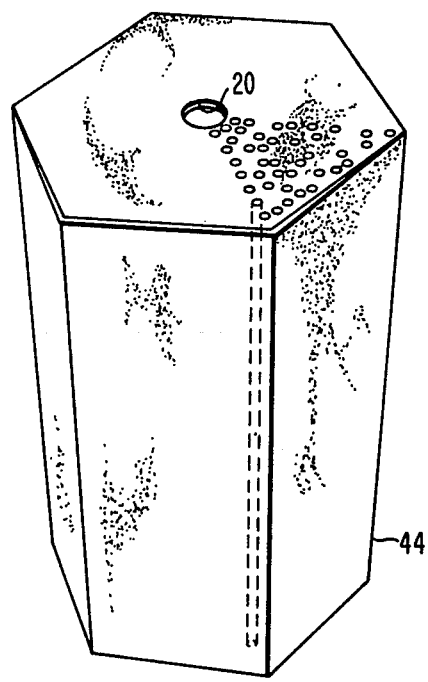
FIG. 4 is a perspective view of the graphite moderator block of the assembly of FIG. 2.

The walls of the vessel 18 contain vertical cavities 24 in which are contained such components as high 26 and low 27 temperature heat exchangers, main circulators 28, turbogenerators 30, and auxiliary cooling heat exchangers 32 and circulators 33 for shutdown and emergency cooling of the reactor. The reactor shown may simultaneously provide heat through an intermediate heat transport loop to a remote process system at a temperature in the range of 1600° F. and electrical power of 262 megawatts from the total of five turbogenerators. FIG. 2 shows temperature and flow conditions throughout the system. Referring now to FIG. 2, during normal full power operation there are five flow streams, noted A, B, C, D, E, that mix at the core 10 exit to provide a total of flow of helium coolant gas of 7,920,000 pounds per hour (lb/hr) at a mixed mean temperature of 1850° F. The first, and largest, noted "A", is coolant passing through the active core. The individual fuel components are discussed in detail below. Flow through fissile elements 40, is 4,647,600 lb/hr, and through fertile elements 42 is 2,635,200 lb/hr, or a total of 7,282,800 lb/hr at 1890° F. Flow between fuel assemblies 12, noted "B", amounts to 158,400 lb/hr at a temperature of 1890° F. Flow through peripheral shield/reflector assemblies 14, noted "C", is 154,800 lb/hr, exiting at a temperature of 1400° F. The fourth stream, noted "D", comes from above the core 10, after passage through control rod mechanisms to provide necessary cooling, and it represents 302,400 lb/hr at 1200° F. The fifth stream, noted "E", is a small percentage of the total flow, and is back leakage through an auxiliary flow path to be used for auxiliary cooling and under assumed accident conditions which would require cooling of the core 10. During normal operation it represents a back flow of 21,600 lb/hr at 450° F.

The mixed flow streams are then split into two main streams. The first passes through five streams, in parallel; each of the five streams includes the gas turbogenerator 30 which also drives a compressor 31. After passage through the turbine, the coolant passes through the low temperature heat exchanger 27 where it gives up heat to a secondary circuit, then through the compressor 31, and back to the reactor core 10 area. The second main stream passes from the core also through five parallel streams, each including a high temperature heat exchanger 26. From the heat exchanger 26 the coolant then flows through the motor driven main circulator 28, which is driven by electrical power which may be provided by the turbogenerators 30, and then returned to the core. The small portion of leakage flow passes in two parallel steams; each stream passes in reverse fashion through the auxiliary circulator 33 and auxiliary heat exchanger 32. When the auxiliary system is placed in operation, flow will be through the core, then through the auxiliary heat exchangers 32, then through the motor driven auxiliary circulators 33, and returned to the core. Table I presents the energy distribution in the system.

TABLE I

| | |
|---|---|
| Heat Generated In Core | 3000 MW |
| Energy Added By Main Circulators | 27.1 MW |
| Heat Transferred In High Temperature Heat Exchangers | 1555 MW |
| Heat Transferred In Low Temperature Heat Exchangers | 1189 MW |
| Heat Loss - Auxiliary Heat Exchangers | 0.8 MW |
| Heat Lost To PCIV | 5. MW |
| Energy To Generators | 276. MW |

The high and low temperature heat exchangers may provide heat to helium in an intermediate circuit, which in turn provides heat, through heat exchangers, to a process system.

The heart of the reactor system which provides significant advantages in fuel usage is the fuel assembly 12, and its components, shown in FIGS. 3 through 7. It provides not only direct cooling of the fuel elements and resulting high temperature coolant gas, but also separate fissile 40 and fertile 42 fuels elements contained in a moderator block 44. The moderator block 44 functions to (1) removably contain the fuel elements 40, 42, (2) moderate neutron flux, (3) provide for insertion of control elements, (4) provide for removal and handling of the assembly, and (5) provide aligned coolant passageways. The moderator block 44 shown is an elongated regular hexagon. Although other geometric cross-sections could be used, such as pentagonal or octagonal, among others, the hexagonal shape is the most ideal. It allows support and restraint of an assembly 12 in a given location, even during refueling when a radially adjacent column of assemblies is removed. The plurality of hexagonal assemblies permits the core to approach the configuration of a right circular cylinder which provides good power distribution. The block 44 may be made of any suitable refractory material that can be manufactured with relative ease, that will retain structural strength and dimensional stability at the contemplated reactor operating temperature, that has relatively good thermal conductivity, that has good neutron moderating characteristics, and a low neutron capture cross-section. Dense carbon or graphite materials are typically used. The block 44 for the exemplary reactor system is 33¾ inches high and 42 inches across flats. It is well known that achieving the necessary structural stability of the block 44 during manufacturing and machining is dependent upon the length of the free path available for removal of gases released during firing of the block. It has been found that incorporation of an enlarged central passageway 20 prior to firing allows the necessary free path, and results in a larger block 44 than has typically been used in prior HTGR's. The centrally located passageway 20 in the exemplary reactor system is a 6 inch diameter circle, extending throughout the length of the block 44, although a non-circular shape could be utilized. The central location of the passageway 46 is an optimum location for passage of the control element 22 to control reactor power. A plurality of smaller control passageways distributed across the block 44 cross-section could also be used consistent with both the control and manufacturing functions. The central control passageway 20 may also be utilized for insertion of a handling tool to grip the assembly. An indented cutout may be disposed about the passageway 20 below the top of the block 44, to facilitate handling.

Figure 5:
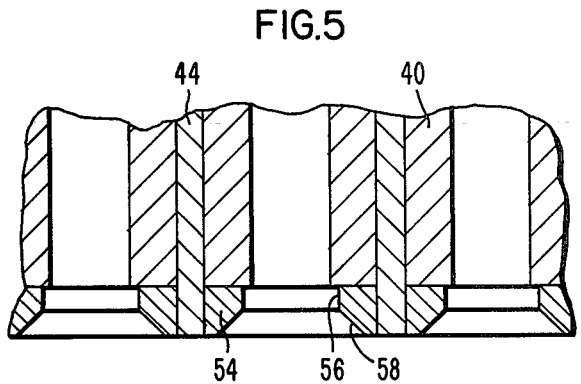
FIG. 5 is a partial elevation, in cross-section, of the bottom portion of the fuel assembly of FIG. 3.

Subsequent to firing, a plurality of fuel element passageway 48 are machined vertically through the block 44. The passageways 48 are sized to removably retain the fissile 40 and fertile 42 fuel elements. This may be provided by a two to three thousandths of an inch gap during assembly. Although the fuel passageways 48 may be similar in cross-section, to insure proper placement of separate fissile 40 and fertile 42 elements in an assembly 12, fissile fuel passageways 50 and fertile fuel passageways 52 of differing cross-section are preferably used. The preferred shape of these passageways is cylindrical, to minimize the effects of differential shrinkage between the block and the fuel elements. With fuel elements as discussed below, a differential shrinkage of one to two percent in diameter can be allowed without weakening the block 44 or bypassing a significant portion of the coolant between the block and fuel elements. In the exemplary reactor system, 892 fuel passageways 50, 52 are spaced along the block cross-section on a 1.3 inch pitch. Direct cooling of fuel elements 40, 42 inside the passageway significantly lessens concerns about block-element interaction. Operational reduction of the fuel element outer dimension will always be greater than reduction of the passageway dimensions 50, 52. Further, any enlargement of the gap between the element and block during operation will not be of sufficient magnitude to induce unacceptable vibration, even if some coolant is flowing through the gap. In the exemplary system, there are twice as many fertile fuel elements 40 (588) as fissile fuel elements 42 (294). As the fuel elements 40, 42 are removably mounted in the moderator block 44, a means must be provided to retain the elements in the block during operation and during removal from the core. One method of performing this is to permanently place a retainer at one end of each of the fuel passageways. FIG. 5 shows a refractory retainer 54, bonded to the block 44 with an internal opening 56 that exposes the bottom portion of a fuel element 40, 42. The opening 56 allows the element to be pushed out of the block when so desired. The retainer 54 in the exemplary reactor system extends into the block 44 approximately ⅜ inch. A chamfered portion 58 of the retainer 54 assists the flow of coolant gas into the central portion of the fuel element. If fuel elements are slightly misaligned between two vertically adjacent assemblies, the chamfer 58 will insure an aligned continuous coolant flow path. A removable retainer, such as one threaded or pinned into the moderator block 44 at one or both extremities could alternatively be utilized. Such removable retainers are preferably utilized in later core cycles, when a portion of the power distribution has shifted from the initially fissile material containing fuel elements 42 to the initially fertile material containing fuel elements 40, as discussed hereinafter. The internal opening 56 can therefore be increased, or decreased, to allow respectively more, or less, coolant to flow through a given element 40, 42. With such removable retainers 54, the opening 56 may be smaller than the size necessary to expose a portion of the element 40, 42, as the retainer 54 may be removed and then the element pushed out of the block 44.

To help provide reactivity control at the beginning of the fuel cycle, burnable neutron poisons may also be incorporated into the moderator block 44 during manufacture. The burnable poison may be homogeneously distributed throughout the block 44 so as to provide the required beginning-of-cycle reactivity compensation for the presence of the higher inventory of fresh fissile fuel. A poison such as natural boron will undergo an $(n,\alpha)$ reaction during irradiation leading to the release of helium and the formation of lithium-7. The helium will add neglibibly to the coolant inventory, which is typically helium, while the lithium-7 will be retained for the most part in the moderator block 44. A small amount of the lithium may diffuse into the coolant stream, and eventually be removed by a coolant purification system.

Figure 6A:
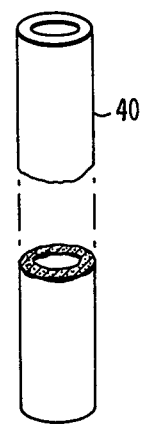
FIGS. 6A and 6B are isometric views of the fuel elements of the fuel assembly of FIG. 2.
Figure 6B:
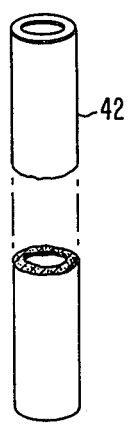

The fuel elements 40, 42 removably inserted into the fuel element passageways 50, 52 function to contain the nuclear fuel and to additionally moderate the nuclear reaction. They are directly cooled by the coolant gas, providing extremely efficient heat transfer. This allows higher coolant temperatures without exceeding maximum safe fuel operating temperature. The exemplary fuel elements 40, 42 are shown in FIGS. 6A and 6B. Both elements are shown as elongated right circular cylinders with a central circular coolant passageway extending therethrough. Other geometric shapes for the elements or passageways could be used. The fissile element 40 shown is 1.162 inches in outer diameter, and 0.882 inches in inner diameter. The fertile element 42 is 1.000 inch in outer diameter and 0.507 inch in inside diameter. Both elements 40 and 42 are 33.25 inches in axial length. With a retainer ring extending ⅜ inch into the block, this allows about ⅛ inch clearance between the top of the fuel elements and the top of the block, insuring no interference when the fuel assemblies are stacked one atop another in a column.

The extruded fuel elements 40, 42 include a multitude of fuel particles 60 (FIG. 7) homogeneously distributed in a high density extruded graphite matrix. The extrusion process and higher graphite matrix density provide the fuel elements 40, 42 with structural integrity even at the extended length compared to prior art elements. A preferred graphite matrix density of approximately 1.9 grams per cubic centimeter provides not only added strength, but an increase in thermal conductivity which, in conjunction with direct fuel cooling, assists in attaining higher coolant temperatures. The high density fuel matrix is attained by use of an 85-to-15 ratio of graphite flour to carbon black in the extrusion mix. The graphite flour is previously heated to a temperature in the range of 2700° C. to 2800° C., and is superior in thermal conductivity to glassy carbon heated to about 1800° C. as is typical in prior art HTGR's. The molded stick manufacturing process used in the typical HTGR achieves about 62 volume percent fuel particles. The exemplary reactor system is based upon a fuel particle fraction in a fuel element 40, 42 of about twelve to twenty-four volume percent. Thus, the fuel elements 40, 42 may be expected to experience lower fuel particle 60 damage than might result from a higher fuel particle packing density which, however, could be used. Coated, generally spherical fuel particles 60 as are in standard use in the art, including those generally referred to as "Biso" and "Triso" coated particles, are the basis of the exemplary reactor system. The particles 60 comprise a fuel oxide microscopic core 62 of fuel such as oxides of $U^{235}$, $U^{233}$, or $Th^{232}$, surrounded serially by coatings such as a porous pyrocarbon buffer coat 64, a dense isotropic pyrocarbon coat 65, and in the "Triso" particles subsequent layers of silicon carbide and isotropic pyrocarbon 66. The cores 62 of the fissile particles 68 and fertile particle 70 are approximately 200 microns and 500 microns in diameter, respectively.

The advantages offered by physical separation and removable insertion of fissile 40 and fertile 42 fuel elements will be readily apparent to one skilled in the art of HTGR fuel management. They include (1) a simplification in manufacturing of fuel elements, (2) simplification in reprocessing of fuel, and (3) the ability to vary the in-pile lifetime of the fertile and fissile elements, all of which tend to increase the overall efficiency in fuel usage.

Manufacturing of fuel is simplified as there is no need to separately form and then homogeneously distribute in a matrix multiple types of fuel particles, as is presently done in most HTGR fuel. The major benefits, however, derive from simplified reprocessing, as there is no need for mechanical separation of fissile particles from particles containing initially fertile and subsequently bred fuel, and from the ability to burn, in-situ, bred fuel without reprocessing. Although other nuclear fuels may be utilized, the exemplary reactor is based upon fissile particles of primarily enriched U-235 oxide and fertile particles of primarily virgin Th-232 oxide. The fissile particles comprise U-235 enriched up to approximately 93%. The Th-232 in the fertile particles is ultimately converted to fissionable U-233. The Th-232 to U-233 conversion ratio is high, and is minimally dependent upon variations in operating temperature compared to other potential fuels such as U-238 which converts to Pu-239.

The various components of the fuel assembly will have a different optimum operating life. In particular, breeding of U-233 from Th-232 can be enhanced by a long inpile operating life of the initially fertile material. For example, in fuel as discussed herein, the Th-232 breeds U-233 such that in a few years of operating life it will contribute almost half of the total thermal power of the operating reactor. It will, however, have undergone a rather low burnup, on the order of two to six percent fissions per initial metal atoms. Reutilization of such fuel without the typical reprocessing provides significant economic benefits. On the other hand, the initially highly enriched fissile fuel will provide most of the thermal fissioning power in a newly loaded core from fissioning of the U-235. The U-235, however, will also capture neutrons to form U-236, which is an undesirable non-fissioning neutron poison. The fissile fuel burnup rate is also relatively high, such that in three to four operating years it will experience a burnup to approximately seventy-five percent of the fissions per initial metal atoms. The remaining U-235 is then contaminated with U-236, and should desirably be removed from the reactor core. Consistent with this shift in power, the coolant allowed to flow through a given element may be increased or decreased, by placing retainers with larger or smaller internal openings within the block 44.

Figure 8:
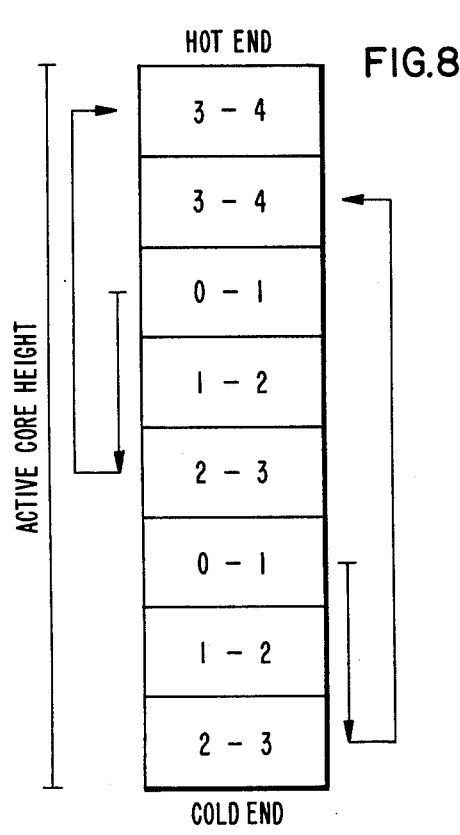
Figure 7A:
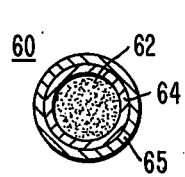
FIGS. 7A and 7B are sectional views of coated fuel particles consistent with this invention; and, FIG. 8 is a schematic showing one method of axial fuel assembly shuffling consistent with this invention.
Figure 7B:
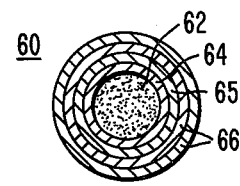

Further, as graphite is subject to effects on structural integrity under long-term irradiation, it is preferred that each block 44 be in the reactor core for four annual cycles. Less time would not provide optimum usage, and additional time may subject the block 44 to structural damage. In view of this, the exemplary reactor system includes eight fuel assemblies in each column, with one shield/reflector assembly 14 at the top and one at the bottom of the column. The active core 10 can thus be viewed as being divided into eight axial layers, each corresponding to the height of one assembly. For purposes of description, these layers are grouped in sets of two, each constituting one-quarter of the core volume. Annual reactor refueling consists of replacing one group of two assemblies each year, with a simultaneous rearrangement of the remaining three groups. Thus each fuel moderator block will have a four year residence in the core. One sequence of rearrangement is shown in FIG. 8, with a given fuel assembly progressing generally downward through the core until the fourth cycle, when it is placed at the exit end of the core. The numbers on the Figure represent the age of the fuel assembly, in years, at each core axial layer. It is not anticipated that fuel assemblies will be shuffled among different columns, although such could be done. The core 10 will also be divided into a plurality of radial zones, as is typically done, while maintaining a fixed ratio of fertile elements 42 to fissile elements 40 throughout the core 10, of two-to-one. The density of fertile particles 68 in each element 42 should not be varied although the density of fissile particles 68 may vary with varying radial zones and fuel cycles from about twelve to twenty-four volume percent.

A given fuel assembly 12 in a given radial zone will therefore proceed through the core 10 as discussed. At the end of the fourth cycle, the assembly is removed to an on-site hot cell. In prior art HTGR's, whatever the total core residence of a fuel assembly, the fuel must either be subsequently totally broken down and reprocessed, as the fertile 70 and fissile 68 particles are homogeneously mixed or at the least be drilled out of the assembly. This is not the case, however, with the instant invention comprising separable fissile 40 and fertile 42 elements. Only the fissile element 40 will be replaced with new fuel and the burned element 40 reprocessed, while the fertile element 42 may be directly recycled without any reprocessing or drilling of the graphite block 44. The block 44 may also be recycled if it has not reached its four-year residence time period. In the hot cell the burned assembly 12 can be aligned with a fresh moderator block 44, and the initially fertile elements 42, now comprising fertile Th-232 and bred U-233, can be pushed into the fertile passageways 52 of the fresh block 44. Fresh fissile elements 40 can similarly be remotely loaded into the fissile passageways 50. These fresh fissile elements 40 may contain particles with a lower enrichment than the original fissile elements in the assembly and column as the initially fertile elements now contain fissionable bred U-233. To achieve the maximum in fuel usage from the initially fertile elements 42, they may reside in four different moderator blocks 44 during their operating lifetime, or a total of sixteen annual cycles of reactor core operation. The benefits resulting from the instant invention are most evident, especially in view of current HTGR fuel arrangements which, on a short-time scale, require the expensive, time consuming, and destructive processes associated with homogeneously distributed fuel including separation of particles, separation of isotopes, and remanufacturing of fuel elements and assemblies. And, prior art HTGR fuel arrangements have resulted in limited maximum coolant temperatures.

This invention therefore provides a fuel arrangement for a high temperature gas cooled reactor capable of achieving high coolant temperatures while providing increased fuel usage with lessened fuel reprocessing. Bred fuel may be burned in-situ, without destructive reprocessing or separation from initially fissile fuel. It will be apparent that many modifications and variations are possible in view of the above teachings. It therefore is to be understood that within the scope of the appended claims, the invention may be practiced other than as specifically described.

I claim:

1. A fuel arrangement for a high temperature gas cooled nuclear reactor comprising:
   (a) a first arrangement of elongated cylindrical first fuel elements comprising primarily fissile nuclear material, said first elements having a concentric cylindrical first coolant passageway therethrough,
   (b) a second arrangement of elongated cylindrical second fuel elements comprising primarily fertile nuclear material, said second elements having a concentric cylindrical second coolant passageway therethrough, and
   (c) a plurality of elongated moderator blocks having a hexagonal cross section and each comprising cylincrical holes therethrough perpendicular to said cross-section, said holes being spaced from one another and sized to removably receive said first and second fuel elements, each said hole receiving only one of said elements, a centrally located control passageway parallel to said holes extending through said block, and means to retain each said fuel element within each respective hole, said means being affixed within said holes at an extremity thereof and having a circular cross section and a concentric opening therethrough.

2. A fuel arrangement for a high temperature gas cooled reactor comprising a plurality of adjacent vertical columns, each said column comprising a plurality of fuel assemblies stacked one atop another, each said fuel assembly comprising:
   (a) an elongated block of refractory material having relatively good thermal conductivity and neutron moderating characteristics, which block is of hexagonal cross-section with a central axis running perpendicular to said cross-section, first cylindrical fuel passageways spaced along said cross-section and extending through said block generally parallel to said axis, second cylindrical fuel passageways spaced along said cross-section and extending through said block generally parallel to said axis, said second passageways being spaced from said first passageways, and at least one control passageway spaced along said cross-section and extending through said block generally parallel to said axis,
   (b) cylindrical first fuel elements initially comprising primarily fissile nuclear material, said elements sized to be removably received within said first fuel passageways and having an internal first coolant passageway axially extending therethrough,
   (c) cylindrical second fuel elements initially comprising primarily fertile nuclear material, said elements sized to be removably received within said second fuel passageways and having an internal second coolant passageway axially extending therethrough, and
   (d) means to removably retain each said fuel element within its respective fuel passageway, each said means being affixed within each said passageway at an extremity thereof and having a circular cross section and a concentric opening therethrough,
   such that each first coolant passageway is axially aligned with a similar first coolant passageway of the axially adjacent fuel assembly in said column, each second coolant passageway is axially aligned with a similar second coolant passageway of the axially adjacent fuel assembly in said column, each said control passageway is axially aligned with a similar control passageway of the axially adjacent fuel assembly in said column, and such that coolant gas passes in parallel through said aligned first coolant passageways, said aligned second coolant passageways, and said aligned control passageways, and control elements may be removably inserted in said aligned control passageways.

3. The fuel arrangement of claim 2 wherein the diameter of said first fuel passageways is different than the diameter of said second fuel passageways.

4. The fuel arrangement of claim 2 wherein one of said means to removably retain each said fuel element within its respective fuel passageway comprises a cylindrical retainer removably affixed at an extremity of said fuel passageway and said concentric opening of said retainer is of a diameter larger than the diameter of its respective fuel element coolant passageway.

5. The fuel arrangement of claim 2 wherein one of said means to removably retain each said fuel element within its respective fuel passageway comprises a cylindrical retainer removably affixed at an extremity of said fuel passageway and said concentric opening of said retainer is of a diameter smaller than the diameter of its respective fuel element coolant passageway.

6. The fuel arrangement of claim 2 wherein each said fuel element is initially disposed within its respective fuel passageway with a two to three thousandths of an inch diametral gap.

7. The fuel arrangement of claim 2 wherein said at least one control passageway consists of a single passageway of circular cross-section centrally located along said block cross-section sized for receiving a control element.

8. The fuel arrangement of claim 2 wherein one of said means to removably retain each said fuel element within its respective fuel passageway comprises a cylindrical retainer permanently affixed at an extremity of said fuel passageway and said concentric opening of said retainer is of a diameter larger than the diameter of its respective fuel element coolant passageway.

9. A fuel arrangement for a high temperature gas cooled reactor comprising a plurality of adjacent vertical columns of generally hexagonal cross-section, each said column comprising a plurality of fuel assemblies, each said fuel assembly comprising:

(a) an elongated graphite block of generally hexagonal cross-section approximately 42 inches across flats with a central axis approximately 33¾ inches long running perpendicular to said cross-section, 294 first fuel passageways of circular cross-section spaced along said block cross-section and extending through said block generally parallel to said axis, 588 second fuel passageways of circular cross-section spaced along said block cross-section and extending through said block generally parallel to said axis, said first and second passageways spaced on a 1.3 inch triangular pitch, and a six inch diameter circular cross-section control passageway centered along said block cross-section and extending through said block generally parallel to said axis, (b) first fuel elements of circular cross-section of approximately 1.2 inch outside diameter and 33¼ inch in length initially comprising enriched U-235 coated fuel particles in a graphite matrix, said matrix of a density of approximately 1.9 grams per cubic centimeter, said particles comprising a fuel particle fraction of said element of about twelve to twenty-four volume percent, said elements removably received within said first fuel passageways and having an internal first coolant passageway of circular cross-section approximately 0.9 inch in diameter axially extending therethrough, (c) second fuel elements of circular cross-section of approximately 1 inch outside diameter and 33¼ inch in length initially comprising Th-232 coated fuel particles in a graphite matrix, said matrix of a density of approximately 1.9 grams per cubic centimeter, said particles comprising a fuel particle fraction of said element of about twelve to twenty-four volume percent, said elements removably received within said second fuel passageways and having an internal second coolant passageway of circular cross-section approximately ½ inch in diameter axially extending therethrough, and (d) a graphite retainer at one end of each said first and second fuel passageways extending into said block approximately ⅜ inch, said retainers having internal openings to allow flow of said coolant into said first and second elements, such that each first coolant passageway is axially aligned with a similar first coolant passageway of the axially adjacent fuel assembly in said column, each second coolant passageway is axially aligned with a similar second coolant passageway of the axially adjacent fuel assembly in said column, each said control passageway is axially aligned with a similar control passageway of the axially adjacent fuel assembly in said column, and helium gas passes in parallel through said aligned first coolant passageways, said aligned second coolant passageways, and said aligned control passageways, and control elements may be removably inserted in said aligned control passageways.

* * * * *